May 20, 1969 R. L. SCHMOOCK ET AL 3,445,643
ELECTRONIC MULTIPLIER/DIVIDER FOR FLUID FLOW SYSTEMS
Filed Sept. 22, 1966 Sheet 2 of 3

INVENTORS
ROY SCHMOOCK
ISAO ASAI
BY
ATTORNEY 3,445,643
ELECTRONIC MULTIPLIER/DIVIDER FOR FLUID FLOW SYSTEMS
Roy L. Schmoock, Ivyland, and Isao Asai, Hatboro, Pa., assignors to Fischer & Porter Co., Warminster, Pa., a corporation of Pennsylvania
Filed Sept. 22, 1966, Ser. No. 581,325
Int. Cl. G06g 7/16, 7/57
U.S. Cl. 235—194                                   8 Claims This invention relates generally to analog computer circuits and in particular to an analog multiplier/divider which may be utilized in conjunction with fluid flow measuring devices.

In many process loops, sub/computation is necessary in order to effect a predetermined output signal. This computation is analog in nature and of the form $I_o = KAB/C$. Existing devices which perform this function are mechanical or electromechanical and hence complicated to manufacture and maintain; particularly where inputs deviate from absolute and further predetermined constants must be introduced.

Accordingly, it is the object of this invention to provide an analog multiplier/divider circuit which is solid state throughout, and economical both from the maintenance and manufacturing points of view.

It is the further object of this invention to provide a circuit which is extremely flexible and by means of a simple expedient, such as a pair of jumper wires, may be programmed for alternative arithmetic functions.

It is the further object of this invention to provide a device of the foregoing type which is adaptable to flow signals represented on other than an absolute scale.

It is the still further object of this invention to provide for an adjustable K in the expression $KAB/C$.

Briefly, the invention is predicated upon a concept analogous to, yet not precisely the same as, pulse-width-pulse amplitude multiplication. One input signal in conjunction with a feedback signal from a second input is employed to produce a duty-cycle signal whose off-time to total-signal-time ratio is used as a multiplier for a third input; the resultant output providing $AB/C$. Specific circuits are employed in the arithmetic chain to introduce appropriate constants and to zeroize, by means of biasing circuits, input signals on other than an absolute scale.

The above mentioned and other features and objects of this invention and the manner of attaining them will become more apparent and the invention itself will best be understood by reference to the following description of an embodiment of the invention taken in conjunction with the accompanying drawings wherein.

Figure 1:
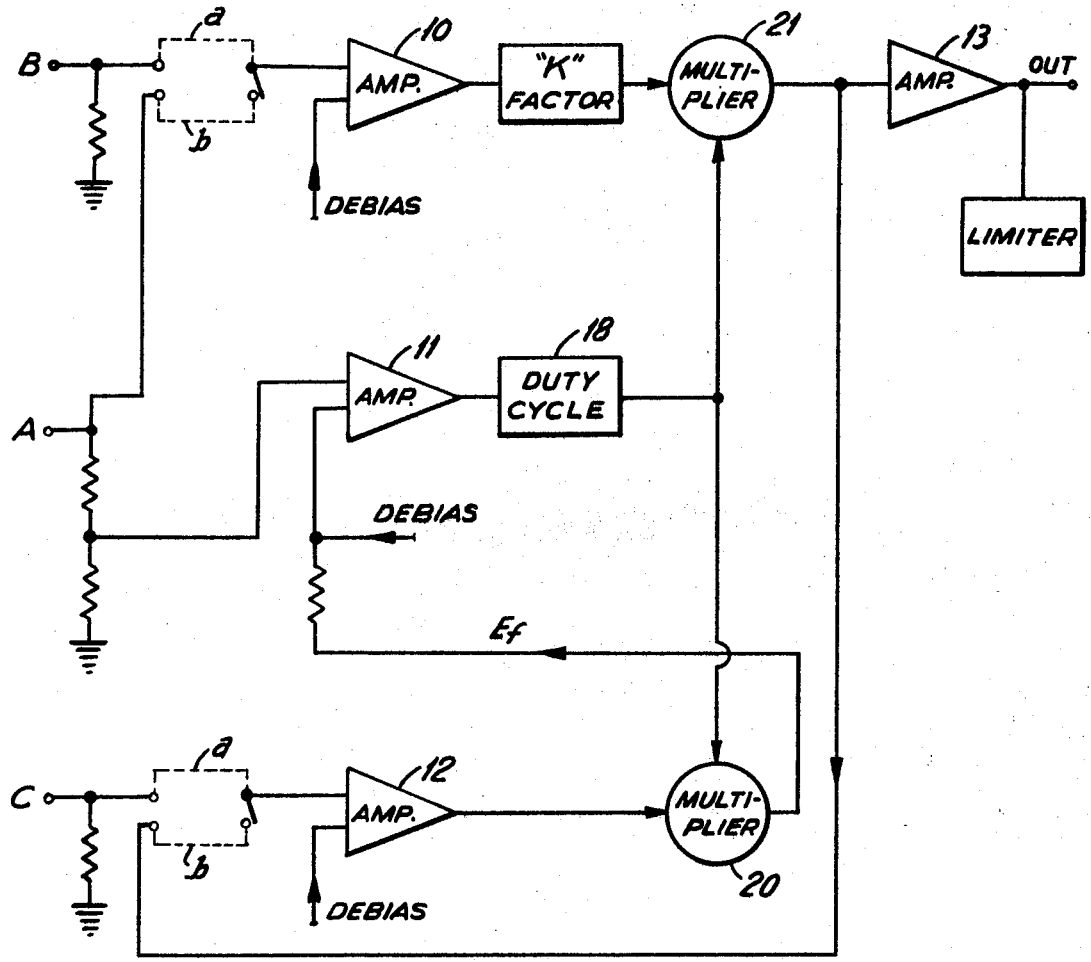
FIG. 1 is a schematic block diagram of the multiplier/divider of the invention.
Figure 6:
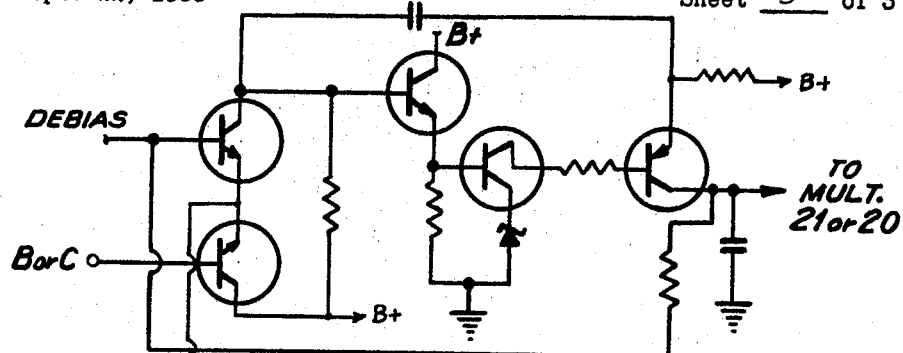
Figure 7:
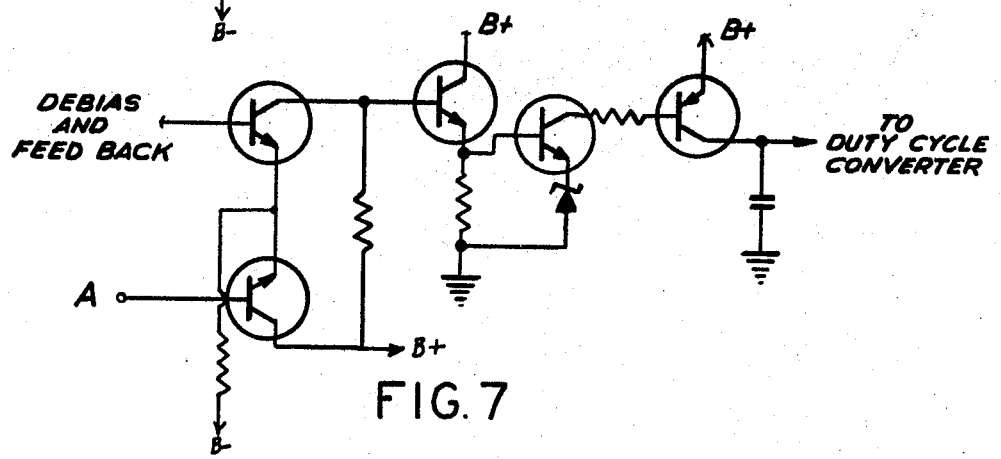
Figure 8:
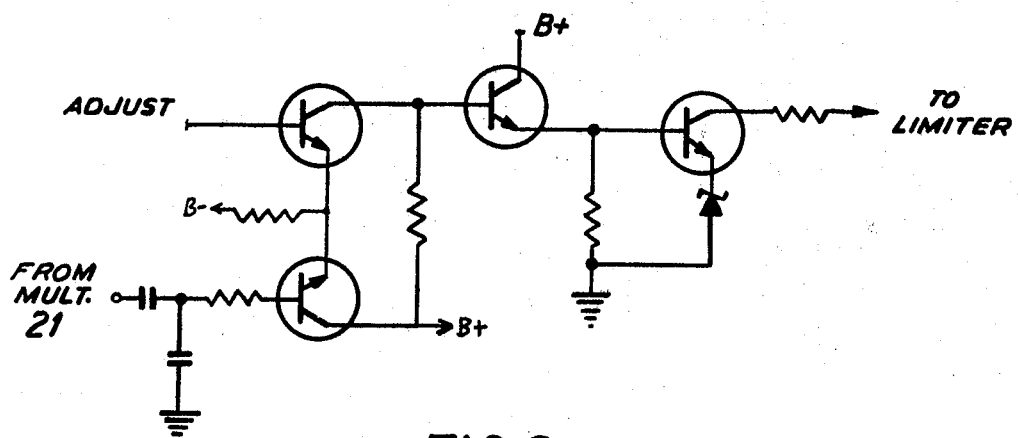

FIGS. 6 through 8 show illustrative circuits for amplifiers 10, 11, 12 and 13 of FIG. 1.

Turning now to FIG. 1, there may be seen a simplified block diagram of the multiplier/divider of the invention. To the left of this figure, it may be seen that the B and C inputs are fed to a pair of terminal jumpers $a$ and $b$ whose insertion determines the arithmetic function which the unit will perform. Table 1 below indicates the functions solved for the possible permutations of the jumpers on inputs B and C.

TABLE 1

| Jumper | | Function | |
|---|---|---|---|
| Input B | Input C | solved | Remarks |
| a | a | $K_1A(B \pm K_2)/C \pm K_3$ | |
| a | a | $K_1A(B \pm K_2)$ | "C" is replaced by a constant. |
| a | b | $K_1\sqrt{A(B \pm K_2)}$ | "C" is replaced by $a_2$dB. |
| b | a | $K_1A^2/C \pm K_3$ | "B" is replaced by "A." |
| b | a | $K_1A^2$ | "B" is replaced by "A" and "C" is replaced by a constant. |
| a | a | $K_1A/C \pm K_3$ | "B" is replaced by a constant. |
| a | b | $K\sqrt{A}$ | B is replaced by a constant. C is replaced by $a_1$d. |
| a | a | $KA$ | B and C are replaced by constants. |

In the remarks column, an appropriate indication is given as to how the result is effected. For a consideration of this invention, it will be presumed that the $a$ jumpers only are effective, and each of the inputs A, B and C is a positive D.C. analog signal.

Each of the amplifiers 10 through 13 comprises a D.C. differential amplifier module of conventional type. Two of the modules, 10 and 12, are buffer amplifiers for inputs B and C, and have a stable gain of approximately 2. Because high stability and low gain are required of these amplifiers, each will preferably include an internal negative feedback path.

Module 11, on the other hand, for reasons which will be described, requires high gain for driving the duty-cycle converter. Hence, feedback is omitted in this amplifier. Amplifier 13 is a voltage-to-current converter with a constant conversion factor and a high output impedance.

Since it would detract from the present invention to enter upon a detailed analysis of each of these amplifiers when each is sufficiently known in the art, no such analysis will be undertaken. However, details of exemplary amplifiers may be had by reference to FIGS. 6 through 8; FIG. 6 illustrating amplifiers 10 and 12; FIG. 7 illustrating amplifier 11, and FIG. 8 illustrating amplifier 13.

Each of the inputs A through C is applied to its respective amplifier module in conjunction with a debias signal (see FIG. 1). The function of the debias signal is relegated solely to the specific application of the invention wherein the signals appearing on inputs A through C represent pressure and temperature signals on an other than absolute scale. For example, a temperature signal from 4 to 20 ma. may represent 50 to 150° F. rather than 510 to 610° F. It, therefore, becomes of prime importance that the systems have proper biasing so that the computer can effectively operate on such inputs. Accordingly, each of the amplifier systems is provided with a debiasing circuit for effecting an absolute scale. These circuits may be extremely simple and constitute no more than a tapped potentiometer having a voltage appearing across its ends.

Figure 3A:
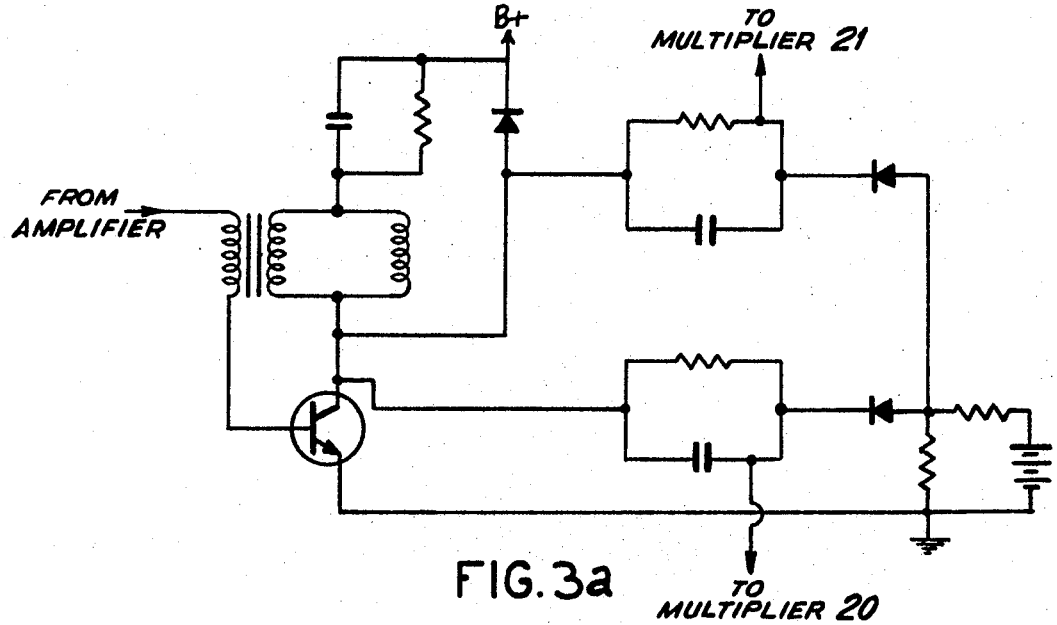
FIG. 3(a) shows one example of a direct current to a duty-cycle converter.
Figure 3B:
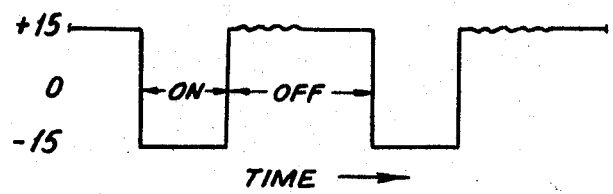
FIG. 3(b) illustrates the duty-cycle time curve.

In addition to the A input, amplifier 11 also has applied thereto a feedback signal emanating from multiplier circuit 20 (a signal whose derivation shall be traced shortly). The output of amplifier 11, which includes the A input as well as the debiasing and feedback signals (the latter two being fed to another entry of the amplifier), may be termed an "error" signal. While this is probably a misnomer, the term is descriptive of continuously present feedback and input signals of this nature, as normally used in the computer art. This error signal is amplified by amplifier 11 and sent to duty-cycle converter 18 which generates the duty-cycle signal. The converter itself may be simply achieved by a blocking oscillator of the type shown in FIG. 3(a) which generates the wave of FIG. 3(b). The typical waveform of the duty-cycle signal is one in which the on-time remains constant while the off-time varies in relation to the error signal; from the order of several micro-seconds to infinity (corresponding to an error signal of zero). Utilized by the remaining circuitry is the ratio of the on-time to the total time (on-time plus off-time).

Figure 2:
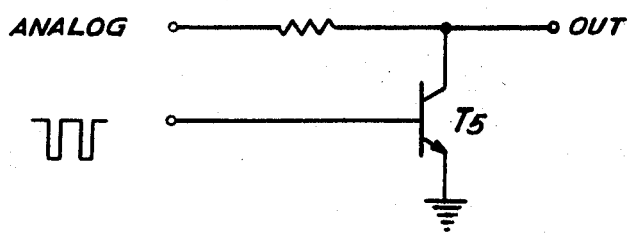
FIG. 2 illustrates in greater detail the multipliers of FIG. 1.

Alternatively, the duty-cycle converter may be constituted by any device which converts a D.C. signal to a time sharing signal. For example, a D.C. to frequency converter controlling a constant pulse width one-shot multivibrator would also be effective as a duty-cycle converter. The duty-cycle signal in turn drives two multipliers 21 and 20, each of which multiplies the duty-scale signal with its respective input; that is, multiplier 21 is effective to multiply the duty-cycle signal by the amplified and K-adjusted A input signal, and multiplier 20 is effective to multiply the amplified C input signal by the duty-cycle. Each of these multipliers (see FIG. 2) employs an epitaxial transitsor with extremely low saturation voltage. The output of multiplier 21 is accordingly a product of the B input and the duty-cycle (the latter as will be shown represents $KA/C$). This output is smoothed by an RC network (not shown) and becomes the input to the voltage-to-output current converter comprising amplifier 13.

Figure 5:
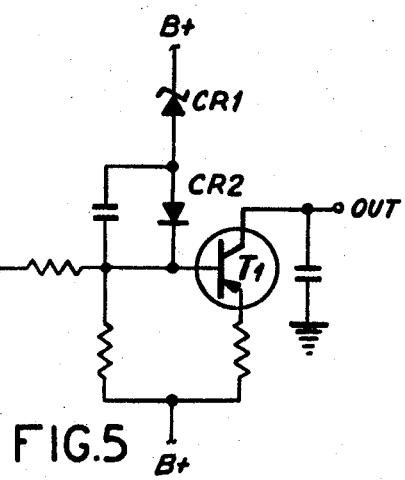
FIG. 5 illustrates a current limiter circuit for use in the output circuit of FIG. 1.

Output current limiting is achieved by $CR_1$ and $CR_2$ of the output circuit (FIG. 5). The B+ appearing on Zener $CR_1$ is applied to the anode of $CR_2$. As the output increases, the voltage at the cathode of $CR_2$ (the base of transistor $T_1$) drops until it is just less than some predetermined critical voltage. At this point, the diode is forward biased and the cathode is held at this critical voltage. The collector current of the transistor can no longer increase and thus the output current is limited.

The output of amplifier 12 provides a reference signal to the second multiplier which is operated upon by the same duty-cycle signal as operates on the multiplier just discussed. The output of this latter multiplier is essentially the product of the duty-cycle and C input and is fed back to the error amplifier 11 to complete the negative feedback loop. The overall feedback loop is thus closed.

A summary of the operation of FIG. 1 is perhaps best analyzed by reviewing the mathematical functions being effected by the various elements. Disregarding the debiasing and K factor influences, the basic relationships may be expressed as follows:

$$A - E_f = e \text{ (error signal)} \quad (1)$$

$$d \text{ (duty-cycle signal)} = \gamma_{11} e \quad (2)$$

$$I_o \text{ (output current)} = \gamma_{10} \gamma_{13} dB \quad (3)$$

$$E_f \text{ (feedback)} = \gamma_{12} dC \quad (4)$$

Eliminating the variables $e$ and $d$ gives:

$$I_o = \frac{\gamma_{10} \gamma_{13} AB}{\gamma_{12} C + \frac{1}{\gamma_{11}}} \quad (5)$$

where $\gamma$ with the numerical subscript refers to the gain of the particular amplifier indicated by the subscript.

From the foregoing, it may be seen that if the gain from $\gamma_{11}$ is very large, Equation 5 reduces to:

$$I_o = KAB/C \quad (6)$$

Thus to summarize, it may be seen that when the gain of amplifier 11 is made very large with respect to the remaining amplifiers, an error signal is produced by the duty-cycle converter which because of the feedback is essentially a constant times $A/C$. This variable is multiplied in multipler 21 as a duty-cycle signal with input B to effect the desired result.

As was mentioned, it is one of the objects of this invention to apply it to fluid handling apparatus. In particular, where mass flow measurement is desired, the mass flow rate of a gas based upon an incoming signal may be ascertained from the differential pressure across an orifice, the gas pressure and the gas temperature. The mass flow rate is given by the formula:

$$Q = K \frac{P}{Ta} Pa \quad (7)$$

Figure 4:
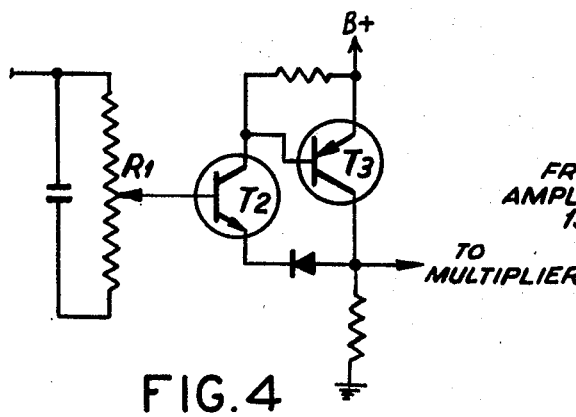
FIG. 4 is a schematic illustration of the variable K circuit for introducing the super-compressibility factor.

Aside from the consideration of absolute values which is taken care of by the debiasing circuits previously explained, real gases deviate from ideal gases by their super-compressibility factor. A series of tables have been tabulated as a function of pressure and temperature to compensate for the super-compressibility and it has been found that the factor may be introduced electrically. The K factor circuit in FIG. 1 is introduced to effect the compensation. This circuit is shown in greater detail in FIG. 4. The square root function is obtained by an external device.

The voltage on the base of the first transistor $T_2$ is varied by varying $R_1$. Varying this voltage controls the voltage at the collector of transistor $T_3$. This voltage is the reference voltage of the multiplier. When an adjustable K factor is desired, the bias is adjusted accordingly.

While the principles of the invention have been described in connection with specific apparatus, it is to be clearly understood that this description is made only by way of example and not as a limitation to the scope of the invention as set forth in the objects thereof.

What is claimed is:

1. A multiplier/divider comprising:
   a first and second multiplier circuit;
   means for coupling a first analog input to said first multiplier circuit;
   means for coupling a second analog input to said second multiplier circuit;
   a high gain amplifier;
   means for coupling a third analog input to said amplifier;
   means for applying the output of said second multiplier to said amplifier as a negative feedback signal;
   means coupled to said amplifier output for deriving a duty cycle signal which shares ON-OFF time dependent upon said amplifier output;
   a means for applying said duty cycle signal to each of said multiplier circuits.

2. The multiplier/divider claimed in claim 1 in which each of said first and second analog input couplings means includes a fixed gain amplifier; each of said amplifiers including means for adjusting the bias of the associated amplifier input.

3. The multiplier/divider claimed in claim 2 further comprising a voltage-to-current converter coupled to said first multiplier; and means interposed between said first multiplier and said converter for smoothing the output of said multiplier.

4. The multiplier/divider claimed in claim 3 further comprising a current limiter coupled to said converter.

5. The multiplier/divider claimed in claim 3 further comprising K factor adjusting means interposed in said circuit between said first multiplier and the amplifier coupled thereto, said means comprising; an adjustable resistor coupled to the output of said amplifier, a first transistor having its base coupled to said resistor and a second transistor coupled in the emitter-collector circuit of said first transistor.

6. The multiplier/divider claimed in claim 1 wherein said multiplier circuits each comprises an epitaxial transistor of low saturation voltage, the duty-cycle signal being applied to the base of said transistor and the analog signal coupled to the collector of said transistor.

7. A multiplier/divider claimed in claim 1 in which said duty-cycle signal deriving means comprises a blocking oscillator.

8. A multiplier/divider claimed in claim 2 in which said first analog input coupling means further comprises means for decoupling said first analog input and coupling said third analog input to said fixed amplifier and in which said second analog input coupling means further comprises means for decoupling said second analog input and coupling the output of said first multiplier to the other of said low gain amplifiers whereby a variety of arithmetic functions may be performed depending upon respective operations of said coupling and de-coupling means.

References Cited

UNITED STATES PATENTS

| 3,167,649 | 1/1965 | Walp | 235—194 |
| 3,177,347 | 4/1965 | Cowley | 235—193 X |
| 3,278,728 | 10/1966 | Ragsdale | 235—151.34 |

MALCOLM A. MORISON, Primary Examiner.

JOSEPH F. RUGGIERO, Assistant Examiner.

U.S. Cl. X.R.

235—151.34